United States Patent
Roussel et al.

(10) Patent No.: US 11,668,955 B2
(45) Date of Patent: Jun. 6, 2023

(54) SYSTEM AND A METHOD FOR MONITORING THE POSITION OF A BLOCKING DEVICE, AND A METHOD OF EDGING AN OPHTHALMIC LENS

(71) Applicant: Essilor International, Charenton-le-Pont (FR)

(72) Inventors: Laurent Roussel, Charenton-le-Pont (FR); Jean-René Akbal, Charenton-le-Pont (FR); Didier Grand-Clement, Charenton-le-Pont (FR); Olivier Decorce, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 518 days.

(21) Appl. No.: 16/652,756

(22) PCT Filed: Oct. 2, 2018

(86) PCT No.: PCT/EP2018/076760
§ 371 (c)(1),
(2) Date: Apr. 1, 2020

(87) PCT Pub. No.: WO2019/068694
PCT Pub. Date: Apr. 11, 2019

(65) Prior Publication Data
US 2020/0233235 A1 Jul. 23, 2020

(30) Foreign Application Priority Data
Oct. 4, 2017 (EP) .................................... 17306330

(51) Int. Cl.
*G02C 7/02* (2006.01)
*B24B 9/14* (2006.01)
*G01M 11/02* (2006.01)

(52) U.S. Cl.
CPC .............. *G02C 7/024* (2013.01); *B24B 9/146* (2013.01); *G01M 11/0207* (2013.01); *G01M 11/0264* (2013.01)

(58) Field of Classification Search
CPC ....... G02C 7/024; B24B 9/146; B24B 47/225; G01M 11/0207; G01M 11/0264; G01M 11/0214
(Continued)

(56) References Cited

U.S. PATENT DOCUMENTS 6,481,095 B1  11/2002 Mizuno
9,254,615 B2  2/2016  Gourraud
(Continued)

FOREIGN PATENT DOCUMENTS

CN  104903049 A  9/2015
CN  105980910 A  9/2016
(Continued)

OTHER PUBLICATIONS

International Search Report and Written Opinion, dated Oct. 18, 2018, from corresponding PCT application No. PCT/EP2018/076760.
(Continued)

*Primary Examiner* — Md M Rahman
(74) *Attorney, Agent, or Firm* — Nixon & Vanderhye

(57) ABSTRACT

A system for monitoring the position of a blocking device on an ophthalmic lens (20) having at least one marking comprises: —a mechanical structure adapted to cooperate with the blocking device; —an image sensor (4) observing the ophthalmic lens (20); —a control unit (10) connected to the image sensor (4) and configured to produce an image having a point of reference with a determined position with respect to the mechanical structure and at least part of the ophthalmic lens (20) including said marking; and—a user interface
(Continued)

(12) adapted to display a blocking device positional compensation proposal for an automatic positional compensation or for a manual positional compensation based on the comparison to a predetermined threshold of a distance between the point of reference and the marking on the image. A corresponding method and a method for edging an ophthalmic lens are also proposed.

15 Claims, 2 Drawing Sheets

(58) Field of Classification Search
USPC .................................................. 356/153.01
See application file for complete search history.

(56) References Cited

U.S. PATENT DOCUMENTS

| | | | |
|---|---|---|---|
| 9,574,872 | B2 | 2/2017 | Dubois |
| 10,306,119 | B2 | 5/2019 | Tang et al. |
| 10,549,398 | B2 | 2/2020 | Daimaru et al. |
| 2007/0146687 | A1 | 6/2007 | Divo et al. |
| 2007/0291268 | A1 | 12/2007 | Samukawa |
| 2013/0075465 | A1 | 3/2013 | Schneider |
| 2013/0273815 | A1 | 10/2013 | Schneider |
| 2014/0038500 | A1 | 2/2014 | Brechemier et al. |
| 2014/0364039 | A1 | 12/2014 | Eurin |
| 2015/0002656 | A1 | 1/2015 | Dubois |
| 2015/0293380 | A1 | 10/2015 | Gourraud et al. |
| 2015/0331256 | A1 | 11/2015 | Baudart |
| 2017/0097523 | A1 | 4/2017 | Cacoin et al. |
| 2017/0163857 | A1 | 6/2017 | Tang et al. |
| 2019/0299355 | A1 | 10/2019 | Daimaru et al. |

FOREIGN PATENT DOCUMENTS

| | | |
|---|---|---|
| EP | 0 558 015 A2 | 9/1993 |
| EP | 2199021 A1 | 6/2010 |
| EP | 3088939 A1 | 11/2016 |
| FR | 3022641 A1 | 12/2015 |
| JP | 2001-062689 A | 3/2001 |
| JP | 2006-126645 A | 5/2006 |
| JP | 2006-220713 A | 8/2006 |
| JP | 2007-523389 A | 8/2007 |
| JP | 2007-320006 A | 12/2007 |
| JP | 2014-066792 A | 4/2014 |
| JP | 2015-502578 A | 1/2015 |
| JP | 2015-125300 A | 7/2015 |
| JP | 2016-503517 A | 2/2016 |
| KR | 10-2011-0099547 A | 9/2011 |
| WO | 2013/088021 A1 | 6/2013 |

OTHER PUBLICATIONS

Office Action issued in Chinese Patent Application No. 201880062306.6 dated Apr. 22, 2021.
Office Action issued in Japanese Patent Application No. 2020-512403 dated Oct. 11, 2022.

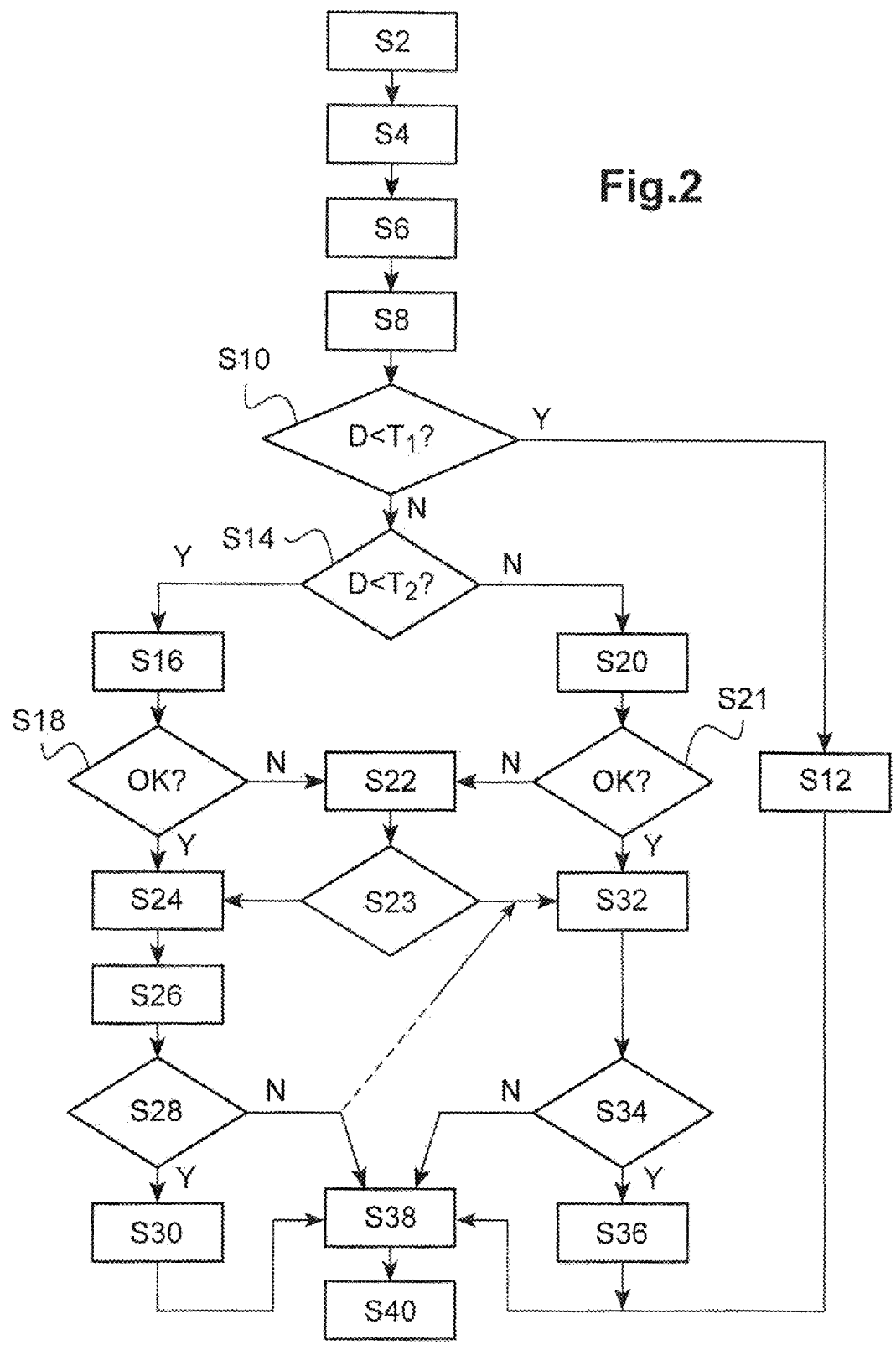

SYSTEM AND A METHOD FOR MONITORING THE POSITION OF A BLOCKING DEVICE, AND A METHOD OF EDGING AN OPHTHALMIC LENS

TECHNICAL FIELD OF THE INVENTION

The invention relates to the manufacture of ophthalmic lenses, in particular when these ophthalmic lenses are to be mounted in a frame.

More precisely the invention relates to a system and a method for monitoring the position of a blocking device, and to a method of edging an ophthalmic lens.

BACKGROUND INFORMATION AND PRIOR ART

In document WO 2013/088 021, an ophthalmic lens having markings and mounted on a support is observed by an image capturing device in order to automatically evaluate a possible difference between the observed markings and a position reference linked to the support.

The difference thus automatically determined is compared to a threshold to possibly generate a warning. Depending on the result of the comparison with the threshold, the difference may also be sent to a device so as to be taken into account, for instance when surfacing the ophthalmic lens.

This method is not entirely satisfactory since the automation of the measurement and of the decision does not offer to the user the possibility to ignore the difference, or to adjust the instructions that have to be taken into account for the processing of the ophthalmic lens.

Therefore, there is still a need to provide a system and a method to efficiently and easily monitor the position of a blocking device on an ophthalmic lens.

SUMMARY OF THE INVENTION

One aim of the present invention is to overcome at least one of the drawbacks of the prior art.

In one aspect, the invention provides a system for monitoring the position of a blocking device on an ophthalmic lens having at least one marking, the system comprising:
- a mechanical structure adapted to cooperate with the blocking device;
- an image sensor observing the ophthalmic lens;
- a control unit connected to the image sensor and configured to produce an image having a point of reference with a determined position with respect to the mechanical structure and at least part of the ophthalmic lens including said marking; and
- a user interface adapted to display a blocking device positional compensation proposal for an automatic positional compensation or for a manual positional compensation based on the comparison to a predetermined threshold of a distance between the point of reference and the marking on the image.

The user can thus easily grasp (and possibly accept or on the contrary refuse) the positional compensation proposal meant to compensate for a possible bad positioning of the blocking device with respect to the lens.

The proposed method may also include any of the following features:
- the user interface is further configured to receive a user input representing a positional compensation input and to display a representation of said marking at a virtual position determined based on the positional compensation input and on the real position of said marking; said virtual position is determined by shifting said real position in accordance with the positional compensation input;
- the user interface is configured to receive a user command for storing a positional compensation action derived from the positional compensation input as a positional compensation configured to reduce the distance between the point of reference and the marking on the image;
- the positional compensation action is stored in an RFID chip;
- the system comprises a communication circuit for sending data based on the positional compensation input to an edging device;
- the positional compensation input includes a translational compensation or a rotational compensation;
- the user interface is adapted to display an action proposal if the distance between the point of reference and the marking on the image is below said predetermined threshold;
- said predetermined threshold is determined based on data relating to the ophthalmic lens;
- said ophthalmic lens is for mounting in a frame;
- said predetermined threshold is determined based on data relating to the frame.

The invention also provides a method for monitoring the position of a blocking device on an ophthalmic lens having at least one marking, said method comprising the following steps:
- mounting the blocking device on the ophthalmic lens;
- producing at least one image including said marking using an image sensor observing at least part of the ophthalmic lens, the image having a point of reference with a determined position with respect to a mechanical structure adapted to cooperate with the blocking device;
- comparing a distance between the point of reference and the marking to a predetermined threshold;
- displaying on a user interface a positional compensation proposal for an automatic positional compensation or for a manual positional compensation on the basis of said comparison.

This method may also comprise:
- receiving a user input representing a positional compensation input via said user interface;
- displaying on said user interface a representation of said marking at a virtual position determined based on the positional compensation input and on the real position of said marking.

The method may also comprise, upon receiving a specific command via the user interface, a step of storing a positional compensation action derived from the positional compensation input as a positional compensation needed to reduce the distance between the point of reference and the marking.

The method may also comprise a step of determining said predetermined threshold based on previously determined positional compensation values. For instance, depending on previous choices of the user, the threshold may evolve in order to better match the user's habits.

The invention also provides a method of edging an ophthalmic lens mounted on a blocking device, comprising the following steps:
- determining a positional compensation arising from the mounting of the ophthalmic lens on the blocking device using the method described above, said positional compensation being based on the positional compensation proposal;

edging the ophthalmic lens along a contour using an edging device adapted to cooperate with the blocking device, wherein said contour is determined based on the determined positional compensation.

DETAILED DESCRIPTION OF EXAMPLE(S)

The invention will be better understood in light of the appended drawings, where:

FIG. 1 schematically shows the main elements of a system according to the invention;

FIG. 2 illustrates the main steps of a method embodying the invention;

Figure 1:
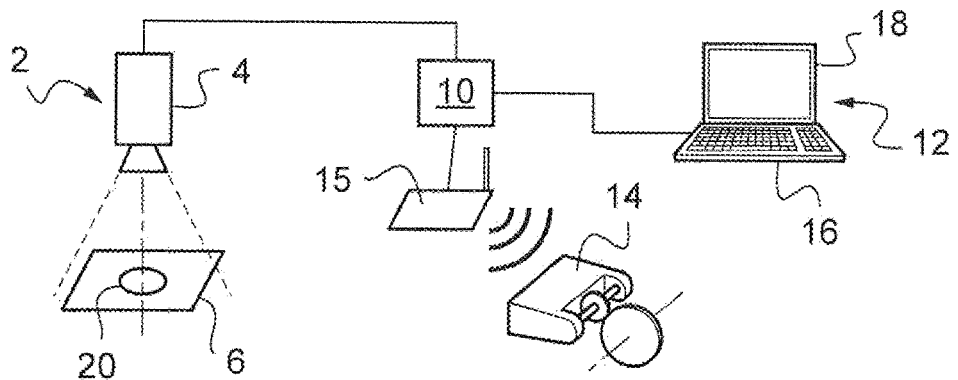

The system shown in FIG. 1 includes a checking device 2, a control unit 10 (such as a processor), a user interface 12, a communication circuit 15 and an edging device 14.

The checking device 2 includes an image sensor 4 connected to the control unit 10 and a support 6. The support 6 is configured to hold a lens 20 and includes a mechanical structure 8 adapted to cooperate with a blocking device 22 carried by the lens 20. (Generally, the blocking device 22 is mounted beforehand on the lens 20 by a centering device. Alternatively, the mounting of the blocking device 22 can be done on the checking device itself, in a first step prior to the production of an image, as described below.)

The image sensor 4 is directed towards the support 6 so as to observe the lens 20, in particular a part of the lens 20 carrying markings M.

The control unit 10 receives the image captured by the image sensor 4, which captured image thus includes at least part of the lens 20 and the markings M.

The control unit 10 is programmed to control display of information intended for the user on the user interface 12 and to receive user inputs via the user interface 12, as further explained below.

In the present embodiment, the user interface 12 includes a keyboard 16 and a screen 18. According to a possible variation, the user interface 12 may be a tactile screen.

FIG. 2 illustrates the main steps of a method possibly implemented in the system of FIG. 1.

Figure 3:
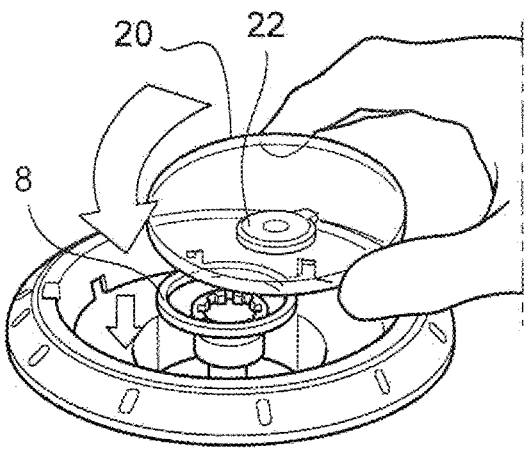
FIG. 3 is a detail view of the system of FIG. 1.

This method starts at step S2 by displaying on the user interface 12 (here on the screen 18) an information asking the user to place the lens 20 on the support 6 of the checking device 2, with the blocking device 22 cooperating with the mechanical structure 8, as schematically shown in FIG. 3.

The user thus places the lens 20 on the support 6 in such a manner that the blocking device 22 cooperates (or engages) the mechanical structure 8.

The mechanical structure 8 is configured so that correct engagement of the blocking device 22 and mechanical structure 8 is possible in one relative position and orientation only, such that the position and orientation of the blocking device 22 with respect to the checking device 2 is known when the blocking device 22 and the mechanical structure 8 engage each other.

The image sensor 4 then captures an image of the lens 20 and blocking device 22 (step S4) as the lens 20 and blocking device 22 are held by the support 6. As noted above, the lens 20 carries markings M, which are thus also present in the image captured by the image sensor 4.

The image sensor 4 is fixed relative to the support 6; thus, the position and orientation of the mechanical structure 8, and hence of the blocking device 22, are known (predetermined) on the captured image. The position and orientation of the lens 20 and its markings M on the captured image depend however on the actual positioning of the lens 20 on the blocking device 22.

The control unit 10 receives the captured image from the image sensor 4 and produces an image including the captured image and a scale S for display on the user interface 12 (here on the screen 18).

The scale S has a fixed position and a fixed orientation relative to the captured image (and hence relative to the support 6 and blocking device 22). The scale S includes in particular a point of reference P. The point of reference P thus has a determined position with respect to support 6, to the mechanical structure 8 and to the blocking device 22.

The point of reference P should theoretically coincide with one of the markings M on the lens 20 (if the blocking device 22 is correctly positioned with respect to the lens 20). However, the point of reference P may in practice appear distant from the concerned marking M due to bad or at least inaccurate positioning of the blocking device 22 with respect to the lens 20.

According to a possible embodiment, the scale S including the point of reference P is a virtual scale added by the control unit 10 onto the captured image to produce the image to be displayed on the user interface 12.

According to another possible embodiment, the scale S including the point of reference P is present (e.g. printed or engraved) on the support 6 and visible through the lens 20 so that the scale S including the point of reference P is included in the captured image. The image produced by the control unit 10 for display on the user interface 12 may then be identical to the captured image. In this embodiment, the point of reference lies outside the mechanical structure 8 (so as to be visible across the lens 20 carrying the blocking device 22) and the theoretical position of the marking M on the lens 20 is outside the region of the lens facing the blocking device 22.

The image produced by the control unit 10 is displayed on the user interface 12 (here on the screen 18) at step S6.

The control unit 10 then determines the distance D (in the produced image) between the point of reference P and the concerned marking M (step S8).

The control unit 10 compares the determined distance D to a first predetermined threshold $T_1$ (step S10). The first predetermined threshold $T_1$ may be defined depending on the context; in particular, the first predetermined threshold $T_1$ may be determined based on data relating to the ophthalmic lens (for instance based on the intended width and height of the lens after edging), or, when the ophthalmic lens is to be mounted in a frame, on data relating to the frame (such as the width and/or height of the rim of the frame).

If the distance D is above the first predetermined threshold $T_1$, the method proceeds to step S14 to correct the alignment error, as explained below.

If the distance D is below the first predetermined threshold $T_1$, the control unit 10 controls the user interface 12 (here the screen 18) to display a message confirming the correct positioning of the blocking device 22 with respect to the lens 20 (step S12). The method then proceeds to step S38 described below.

When the distance D is above the first predetermined threshold $T_1$, the control unit 10 compares the determined distance D to a second predetermined threshold $T_2$ (step S14). The second predetermined threshold $T_2$ is higher than the first predetermined threshold $T_1$. As for the first predetermined threshold $T_1$, the second predetermined threshold $T_2$ may depend on the context; in particular, the second predetermined threshold $T_2$ may be determined based on data relating to the ophthalmic lens (for instance based on the intended width and height of the lens after edging), or, when the ophthalmic lens is to be mounted in a frame, on data relating to the frame (such as the width and/or height of the rim of the frame).

The control unit 10 then controls the user interface 12 (here the screen 18) to display a positional compensation proposal depending on the result of the comparison of step S14.

In the present case, the positional compensation proposal may be the proposal for an automatic positional compensation or for a manual positional compensation.

Precisely, if the distance D is below the second predetermined threshold $T_2$ at step S14, the control unit 10 controls the user interface 12 to display a proposal for an automatic compensation (step S16).

If the user accepts the positional compensation proposal (by selecting a confirmation virtual button on the user interface 12 at step S18), the method then proceeds to step S24 described below for an automatic compensation.

If the user refuses the positional compensation proposal (by selecting a refusal virtual button on the user interface 12 at step S18), the method then proceeds to step S22 described below to allow the user to choose the positional compensation method.

If the distance D is above the second predetermined threshold $T_2$ at step S14, the control unit 10 controls the user interface 12 to display a proposal for a manual compensation (step S20).

If the user accepts the positional compensation proposal (by selecting a confirmation virtual button on the user interface 12 at step S21), the method then proceeds to step S32 described below for a manual compensation.

If the user refuses the positional compensation proposal (by selecting a refusal virtual button on the user interface 12 at step S21), the method then proceeds to step S22 to allow the user to choose the positional compensation method.

Precisely, at step S22, the control unit 10 controls the user interface 12 (here the screen 18) to display a request intended to the user to select a positional compensation method (here among an automatic positional compensation method and a manual positional compensation method).

The user can thus select at step S23 the automatic positional compensation method (by selecting a first virtual button on the user interface 12) such that the method proceeds to step S24, or the manual positional compensation method (by selecting a second virtual button on the user interface 12) such that the method proceeds to step S32.

At step S24, the control unit 10 determines an action proposal for positional compensation.

The positional compensation action proposal C might be automatically determined by the control unit 10 such that, after applying this positional compensation action proposal C, the concerned marking M will be closer to the point of reference P. This may be implemented in practice using an image recognition algorithm and an optimization method. In some of embodiments when several markings are used, the positional compensation action proposal C may be determined such that, after applying this positional compensation action proposal C, the markings M respectively coincide to corresponding points on the scale S.

Figure 4:
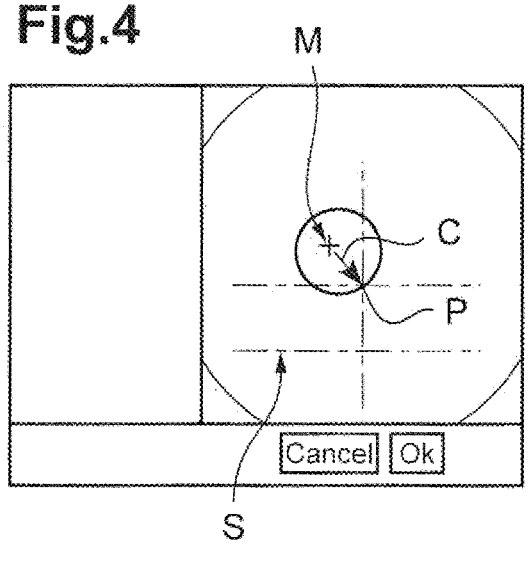
FIG. 4 shows a first exemplary screen displayed on a user interface of the system of FIG. 1.

The control unit 10 then controls the user interface 12 (here the screen 18) to display a representation of the positional compensation action proposal C (step S26), as visible on FIG. 4. In the present embodiment, the control unit 10 also controls the user interface 12 (here the screen 18) to prompt the user to indicate whether he/she accepts the positional compensation action proposal C (step S28).

If the user accepts the positional compensation action proposal C (for instance by selecting an acceptance virtual button on the user interface 12), the control unit 10 stores the positional compensation action proposal C in a memory of the control unit 10 as current positional compensation action (step S30) and proceeds to step S38 described below.

If the user does not accept the positional compensation action proposal C (for instance by selecting a refusal virtual button on the user interface 12), the control unit 10 proceeds to step S38 (or, according to a possible variation, to step S32 as shown in dotted line in FIG. 2) without storing the positional compensation proposal action C in the memory.

At step S32, the control unit 10 detects a possible user input on the user interface 12 (here on the keyboard 16 or on a mouse), the user input corresponding to a positional compensation input meant by the user.

Figure 5:
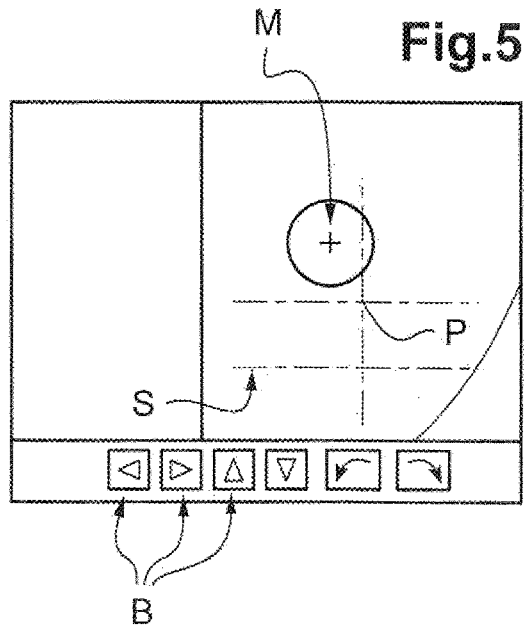
FIG. 5 shows a second exemplary screen displayed on this user interface.

The user input may in practice be the selection of virtual buttons B (displayed on the user interface 12 as shown in FIG. 5) that define a translational compensation and/or a rotational compensation. This step may occur while the image produced by the control unit 10, including the marking M and the point of reference P, is displayed on the user interface 12.

Step S32 may also include displaying (on the user interface 12 and under control of the control unit 10) a representation of the marking M at a virtual position that is shifted (with respect to the real position of the marking M) by a movement determined based on the positional compensation input (in order to simulate the compensation that may be implemented based on the positional compensation input).

Thanks to such user inputs resulting in a positional compensation and to the display in real time of the marking M at a corresponding compensated (shifted) position, the user may adjust in a flexible manner the positional compensation action until the marking M coincides with, or is at least closer to, the point of reference P on the image displayed.

The method continues at step S34 where the user indicates (in practice by selecting a virtual button on the user interface 12) whether he/she accepts the current positional compensation action.

If the user accepts the current positional compensation action (by selecting an acceptance virtual button displayed on the user interface 12), the current positional compensation action (derived from the positional compensation inputs made by the user at step S32) is stored in the memory of the control unit 10 as the final positional compensation action (step S36), i.e. the positional compensation action to be applied when edging as explained below. The control unit 10 then proceeds to step S38.

According to a possible embodiment, the final positional compensation action may be stored in an RFID chip associated with (e.g. carried by) the lens 20. Such an RFID chip (and positional compensation action memorized therein) can be read by an edging machine to take into account the positional compensation action when edging, as described below.

If the user refuses the current positional compensation (by selecting a refusal virtual button displayed on the user interface 12), the control unit 10 proceeds to step S38 without storing the current positional compensation.

At step S38, the control unit 10 launches the edging process.

Step S38 includes for instance displaying on the user interface 12 (under the control of the control unit 10) indications asking the user to place the lens 20 (with the blocking device 22) in the edging device 14. The edging device 14 is adapted to cooperate with the blocking device 22 such that the blocking device 22 (and thus the lens 20) can be mounted in one position and in one orientation only with respect to the edging device 14.

The control unit 10 may also control the communication circuit 15 to send a command to the edging device 14 to initiate the edging process. This command may include contour data defining the contour to be edged and, when applicable, additional data defining the positional compensation action stored in the memory of the control unit 10.

The edging device 14 then edges the lens 20 along a contour that is defined based on the contour data and taking into account the positional compensation defined by the additional data (step S40). Precisely, the contour applied by the edging device is defined by translating and/or rotating points of the sought contour (defined by contour data) in accordance with the positional compensation action defined by the additional data.

The lens 20 can thus be edged exactly where it was planned to be edged, even when the blocking device 22 is not placed at the exact correct position on the lens 20.

The invention claimed is:

1. A system for monitoring the position of a blocking device on an ophthalmic lens having at least one marking, the system comprising:
   a mechanical structure adapted to cooperate with the blocling device;
   an image sensor observing the ophthalmic lens;
   a control unit connected to the image sensor and configured to produce an image having a point of reference with a determined position with respect to the mechanical structure and at least part of the ophthalmic lens including said marking; and
   a user interface adapted to display a blocking device positional compensation proposal, wherein the control unit is configured to control the user interface to display a proposal for an automatic positional compensation or a proposal for a manual positional compensation depending on a result of a comparison to a predetermined threshold of a distance between the point of reference and the marking on the image.

2. The system according to claim 1, wherein the user interface is further configured to receive a user input representing a positional compensation input and to display a representation of said marking at a virtual position determined based on the positional compensation input and on the real position of said marking.

3. The system according to claim 2, wherein said virtual position is determined by shifting said real position in accordance with the positional compensation input.

4. The system according to claim 2, wherein the user interface is configured to receive a user command for storing a positional compensation action derived from the positional compensation input as a positional compensation configured to reduce the distance between the point of reference and the marking on the image.

5. The system according to claim 4, wherein the positional compensation action is stored in an RFID chip.

6. The system according to claim 2, comprising a communication circuit for sending data based on the positional compensation input to an edging device.

7. The system according to claim 2, wherein the positional compensation input includes a translational compensation or a rotational compensation.

8. The system according to claim 1, wherein the user interface is adapted to display an action proposal if the distance between the point of reference and the marking on the image is below said predetermined threshold.

9. The system according to claim 1, wherein said predetermined threshold is determined based on data relating to the ophthalmic lens.

10. The system according to claim 1, wherein said ophthalmic lens is for mounting in a frame and wherein said predetermined threshold is determined based on data relating to the frame.

11. A method for monitoring the position of a blocking device on an ophthalmic lens having at least one marking, said method comprising the following steps:
   mounting the blocking device on the ophthalmic lens;
   producing at least one image including said marking using an image sensor observing at least part of the ophthalmic lens, the image having a point of reference with a determined position with respect to a mechanical structure adapted to cooperate with the blocking device;
   comparing a distance between the point of reference and the marking to a predetermined threshold;
   displaying on a user interface a positional compensation proposal, wherein said positional compensation proposal is a proposal for an automatic positional compensation or a proposal for a manual positional compensation depending on a result of the comparing step.

12. The method according to claim 11, comprising:
   receiving a user input representing a positional compensation input via said user interface;
   displaying on said user interface a representation of said marking at a virtual position determined based on the positional compensation input and on the real position of said marking.

13. The method according to claim 12, comprising, upon receiving a specific command via the user interface, a step of storing a positional compensation action derived from the positional compensation input as a positional compensation needed to reduce the distance between the point of reference and the marking.

14. The method according to claim 11, comprising a step of determining said predetermined threshold based on previously determined positional compensation values.

15. The method of edging an ophthalmic lens mounted on a blocking device, comprising the following steps:
   determining a positional compensation arising from the mounting of the ophthalmic lens on the blocking device using the method of claim 11, said positional compensation being based on the positional compensation proposal;
   edging the ophthalmic lens along a contour using an edging device adapted to cooperate with the blocking device, wherein said contour is determined based on the determined positional compensation.

* * * * *